US 10,246,851 B2

United States Patent
Rajewski

(10) Patent No.: US 10,246,851 B2
(45) Date of Patent: Apr. 2, 2019

(54) HYDROVAC

(71) Applicant: Robert Carl Rajewski, Forestburg (CA)

(72) Inventor: Robert Carl Rajewski, Forestburg (CA)

(*) Notice: Subject to any disclaimer, the term of this patent is extended or adjusted under 35 U.S.C. 154(b) by 0 days.

(21) Appl. No.: 15/615,347

(22) Filed: Jun. 6, 2017

(65) Prior Publication Data

US 2018/0087237 A1    Mar. 29, 2018

(30) Foreign Application Priority Data

Jun. 6, 2016  (CA) .................................... 2932134
Nov. 4, 2016  (CA) .................................... 2947564

(51) Int. Cl.
| | | |
|---|---|---|
| B60P 3/24 | (2006.01) | |
| E02F 3/90 | (2006.01) | |
| B60P 1/04 | (2006.01) | |
| E02F 3/88 | (2006.01) | |
| E02F 9/08 | (2006.01) | |
| E02F 9/20 | (2006.01) | |
| F16H 7/08 | (2006.01) | |

(52) U.S. Cl.
CPC .................. *E02F 3/90* (2013.01); *B60P 1/04* (2013.01); *B60P 3/243* (2013.01); *E02F 3/8816* (2013.01); *E02F 9/08* (2013.01); *E02F 9/20* (2013.01); *F16H 7/08* (2013.01); *F16H 2007/0812* (2013.01)

(58) Field of Classification Search
CPC ........... B60P 3/22; B60P 3/243; B60P 3/2255; E01H 1/108; E02F 3/8816; B62D 33/042

USPC ............................................. 37/304; 220/564
See application file for complete search history.

(56) References Cited

U.S. PATENT DOCUMENTS

| | | | |
|---|---|---|---|
| 1,763,249 A * | 6/1930 | Morris .................. | B28C 5/4282 366/57 |
| 2,362,657 A * | 11/1944 | Meyer .................... | B21D 51/00 220/564 |
| 3,930,324 A | 1/1976 | Wightman et al. | |
| 3,931,907 A * | 1/1976 | Henle .................... | B65D 88/62 220/530 |
| 5,016,717 A | 5/1991 | Simons et al. | |
| 5,295,317 A | 3/1994 | Perrott | |
| 5,299,370 A | 4/1994 | Gyori et al. | |
| 5,408,766 A | 4/1995 | Pobihushchy | |
| 5,425,188 A | 6/1995 | Rinker | |
| 5,491,913 A | 2/1996 | Hutchinson | |
| 5,839,521 A | 11/1998 | Dietzen | |
| 6,059,977 A | 5/2000 | Rowney et al. | |
| 6,547,964 B1 | 4/2003 | Rajewski | |
| 6,604,304 B1 * | 8/2003 | Slabach ................ | E02F 3/8816 37/304 |

(Continued)

FOREIGN PATENT DOCUMENTS

| | | |
|---|---|---|
| CA | 2388680 | 1/2003 |
| WO | 2017136927 | 8/2017 |

*Primary Examiner* — Gary S Hartmann
(74) *Attorney, Agent, or Firm* — Anthony R. Lambert

(57) ABSTRACT

A hydrovac having a chassis, a mud tank and water tank assembly mounted on the chassis, a hydraulic lift assembly capable of raising the mud tank and water tank assembly through a dump angle, the mud tank having a floor, and the floor of the mud tank deepens forwardly. A belt drive is provided for a blower of the hydrovac, along with belt tensioning system.

17 Claims, 8 Drawing Sheets

(56) References Cited

U.S. PATENT DOCUMENTS

| | | |
|---|---|---|
| 6,607,666 B2 | 8/2003 | Rajewski |
| 6,615,849 B1 | 9/2003 | Gilman et al. |
| 6,857,837 B2 * | 2/2005 | Rajewski .............. E02F 3/8816 37/323 |
| 7,076,895 B2 | 7/2006 | Haugen et al. |
| 7,484,322 B2 | 2/2009 | Maybury, Jr. et al. |
| 7,503,134 B2 | 3/2009 | Buckner |
| 7,676,965 B1 | 3/2010 | Nathenson et al. |
| 7,743,537 B2 | 6/2010 | Maybury, Jr. |
| 8,328,290 B2 * | 12/2012 | Malatesta ............. B60P 3/2205 298/17 R |
| 8,336,231 B2 * | 12/2012 | Maybury, Jr. ......... E02F 3/8816 175/66 |
| 9,260,048 B2 * | 2/2016 | Maybury, Jr. ......... E02F 3/8816 |
| 2002/0000748 A1 * | 1/2002 | Fuller ................... B60P 3/2245 298/17 R |
| 2004/0001747 A1 * | 1/2004 | Rajewski ............... A01G 17/16 414/23 |
| 2006/0032012 A1 | 2/2006 | Buckner |
| 2006/0032095 A1 | 2/2006 | Buckner |
| 2008/0040945 A1 * | 2/2008 | Buckner ............... E02F 3/8816 34/406 |
| 2008/0244859 A1 * | 10/2008 | Maybury ............... E02F 3/8816 15/340.2 |
| 2011/0036635 A1 | 2/2011 | Rajewski |
| 2013/0149089 A1 * | 6/2013 | Harms, Jr. ............. B60P 1/006 414/513 |
| 2016/0058260 A1 * | 3/2016 | Boone ................... B60K 17/28 15/320 |

* cited by examiner ic

HYDROVAC

TECHNICAL FIELD

Hydrovacs.

BACKGROUND

Hydrovac trucks include a water tank, water wand connected to the water tank and water pump connected to pump water from the water tank to the water wand, mud tank, vacuum hose with dig tube connected to the mud tank, and blower to blow air from the mud tank and cause a negative pressure that draws material from the vacuum hose, as well as associated controls and drives. Water jets from the water wand are used to dig in soils, which creates a slurry, and the blower causes a vacuum in the mud tank that enables the dig tube to draw the slurry into the mud tank. Regulations limit weight on wheels of hydrovac trucks.

In addition, vibration from a hydrovac engine can cause maintenance issues for driving a hydrovac blower using a gear train.

SUMMARY

The inventor noticed that typical rearward sloping floor designs make the weight of water and mud move to the rear of the hydrovac, putting potentially excessive load on the rear wheels. The proposed design has water is at the bottom and is a legal load going to the job. As the water gets used, the mud and water go to the second floor (mud tank) which loads more to the front to distribute the weight load onto all the wheels in the back and the front to allow maximum capacity.

A hydrovac with a belt drive for a hydrovac blower is also disclosed. The belt drive is provided with an air tensioning system. An articulated hydrovac is also disclosed.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

A "hydrovac unit" as used herein comprises the necessary conventional components, some of which are for example described herein, to make a hydrovac unit work. When the word "mounted" is used, the item may be mounted directly or indirectly on the object referred to.

Figure 1:
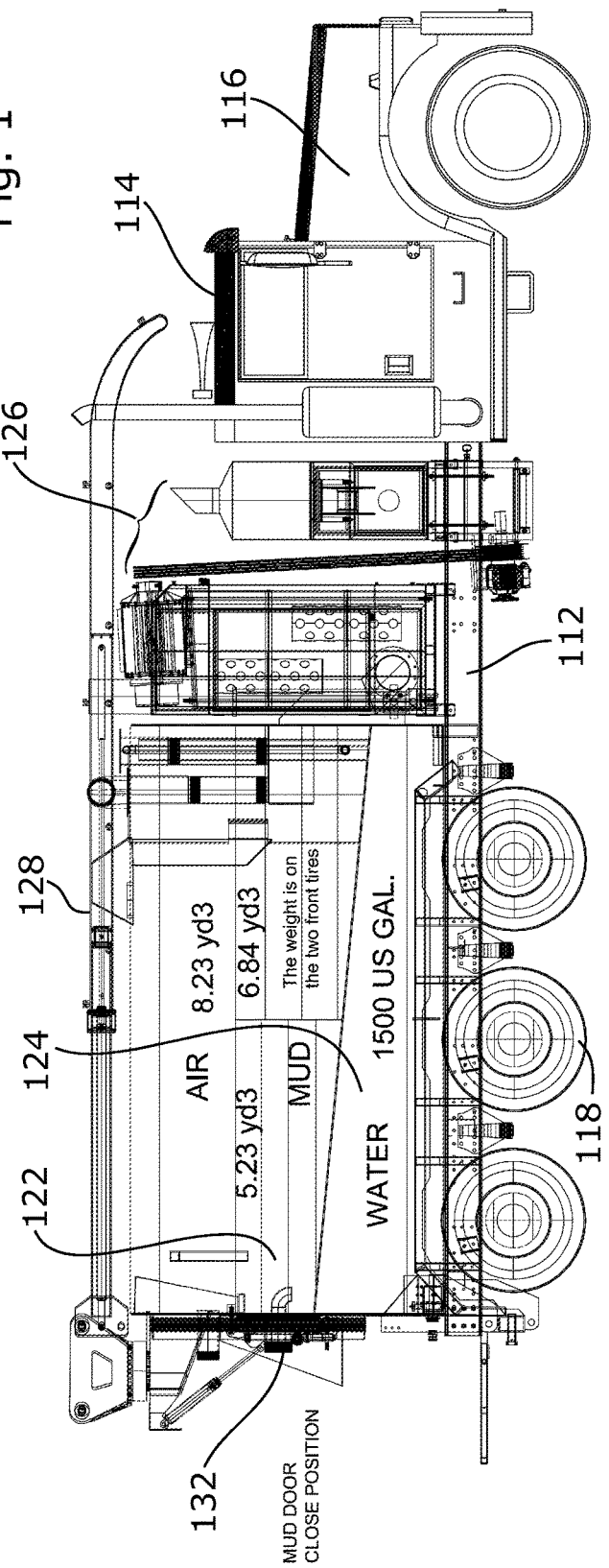
FIG. 1 is side view, partly cut away, of a hydrovac.
Figure 2:
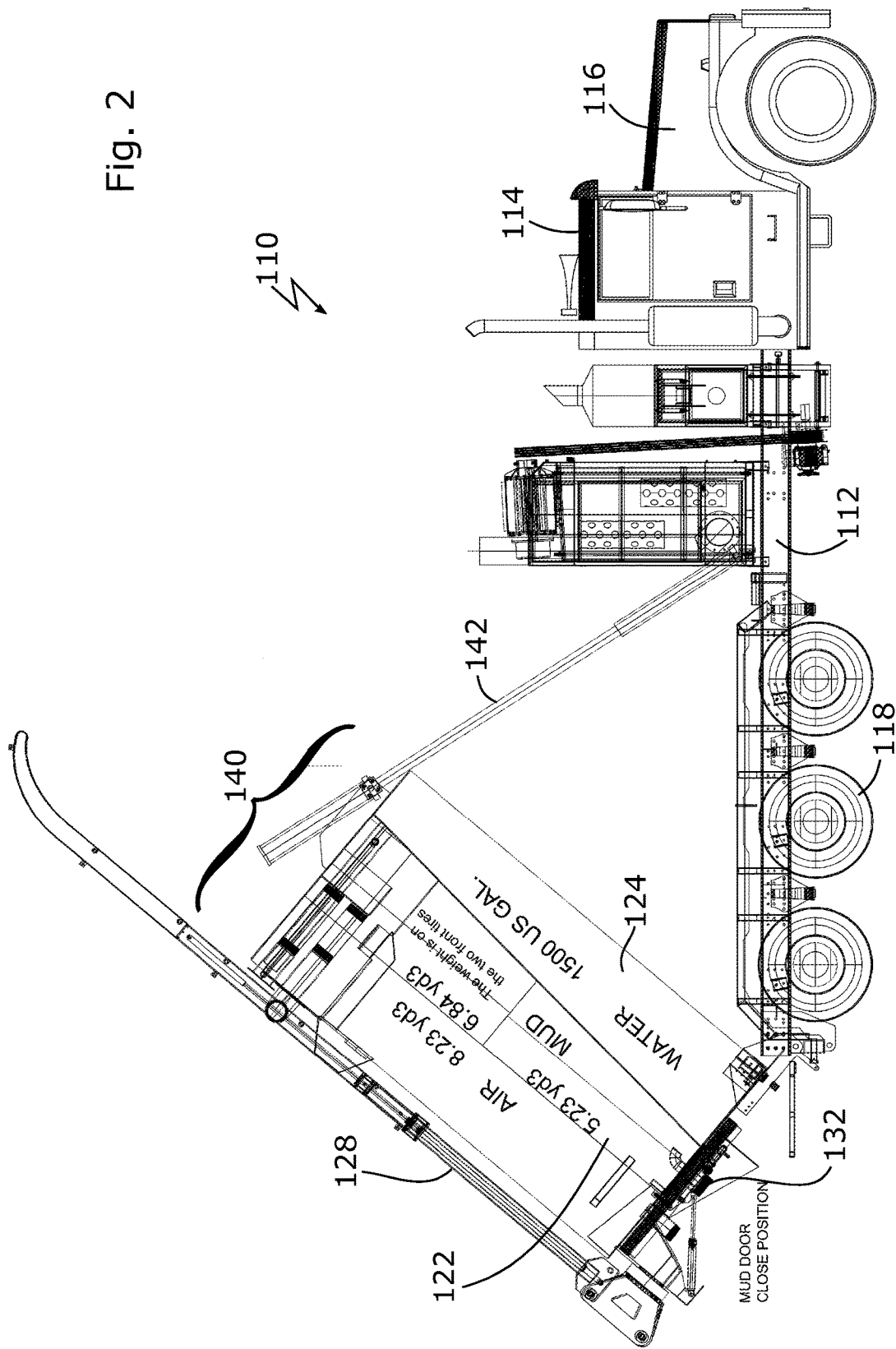
FIG. 2 shows the hydrovac of FIG. 1 in dumping position, with dump door closed.

Referring to FIG. 1 and FIG. 2, there is shown a hydrovac in operational position (FIG. 1) and dumping position (FIG. 2). A conventional hydrovac unit 110 has a chassis 112 mounted on wheels 118, on the front of which is mounted a cab 114 and a conventional internal combustion engine 116. The cab defines the front of the hydrovac 110, the opposite end of the hydrovac being the rear. On the rear of the chassis 112 is mounted a mud tank 122, water tank 124 and mechanical components 126 for the mud tank 122 and water tank 124. In combination, the mud tank 122 and water tank 124 form a mud tank and water tank assembly 140. The mechanical components 126 include such conventional components as a blower, air filter, vacuum breaker, water pump and silencer, all of which are known in the art and used in conventional hydrovac units. A boom 128 is mounted on the mud tank 122. The boom 128 carries the conventional hose (not shown) that is used to dig holes for placing utility equipment such as utility poles. Controls (not shown) for the mud tank 122, hose and boom 128 may be mounted on a panel at the rear of the chassis 112, or the boom controls may be located on the wand.

Figure 3:
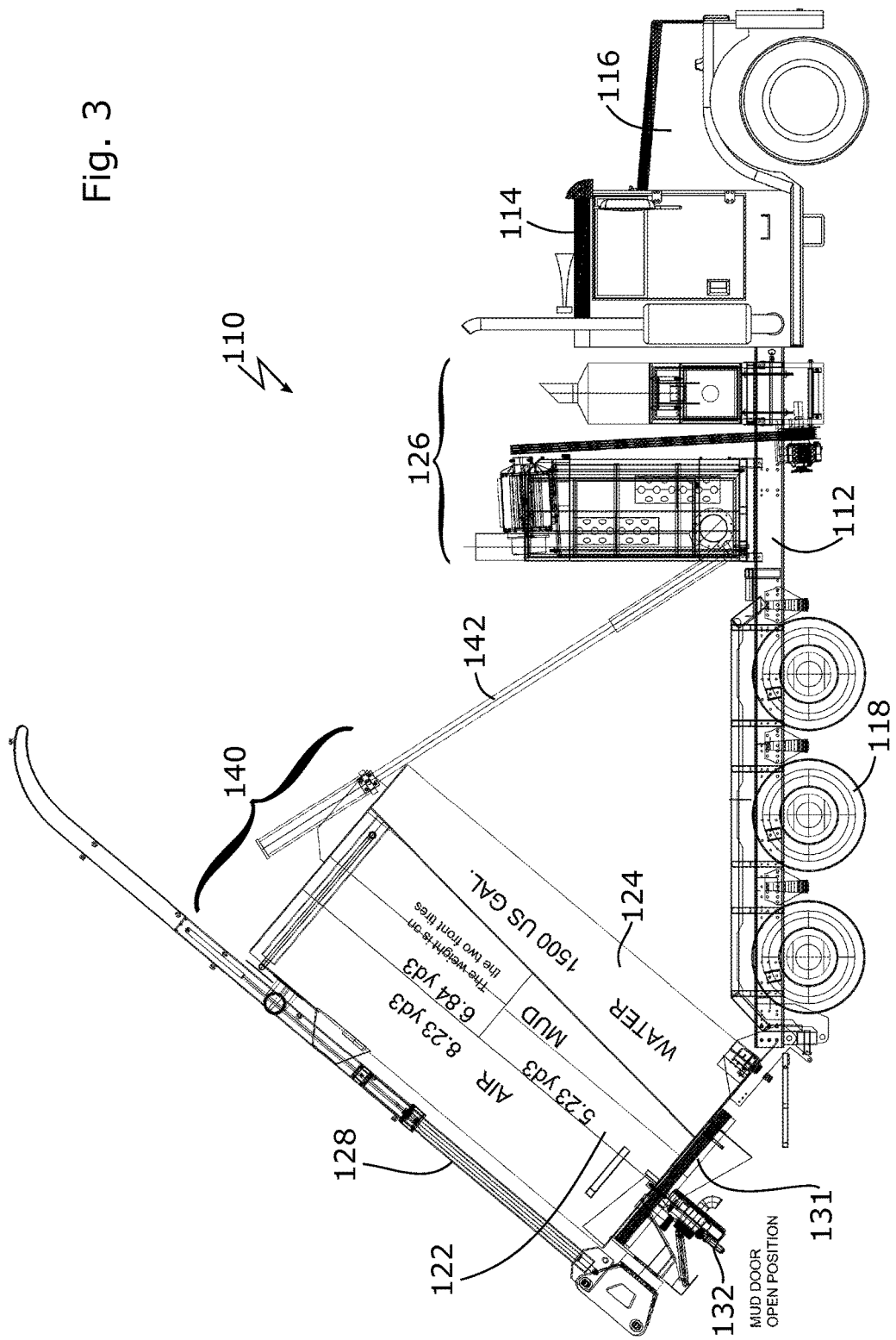
FIG. 3 shows the hydrovac of FIG. 1 in dumping position, with dump door open.
Figure 4:
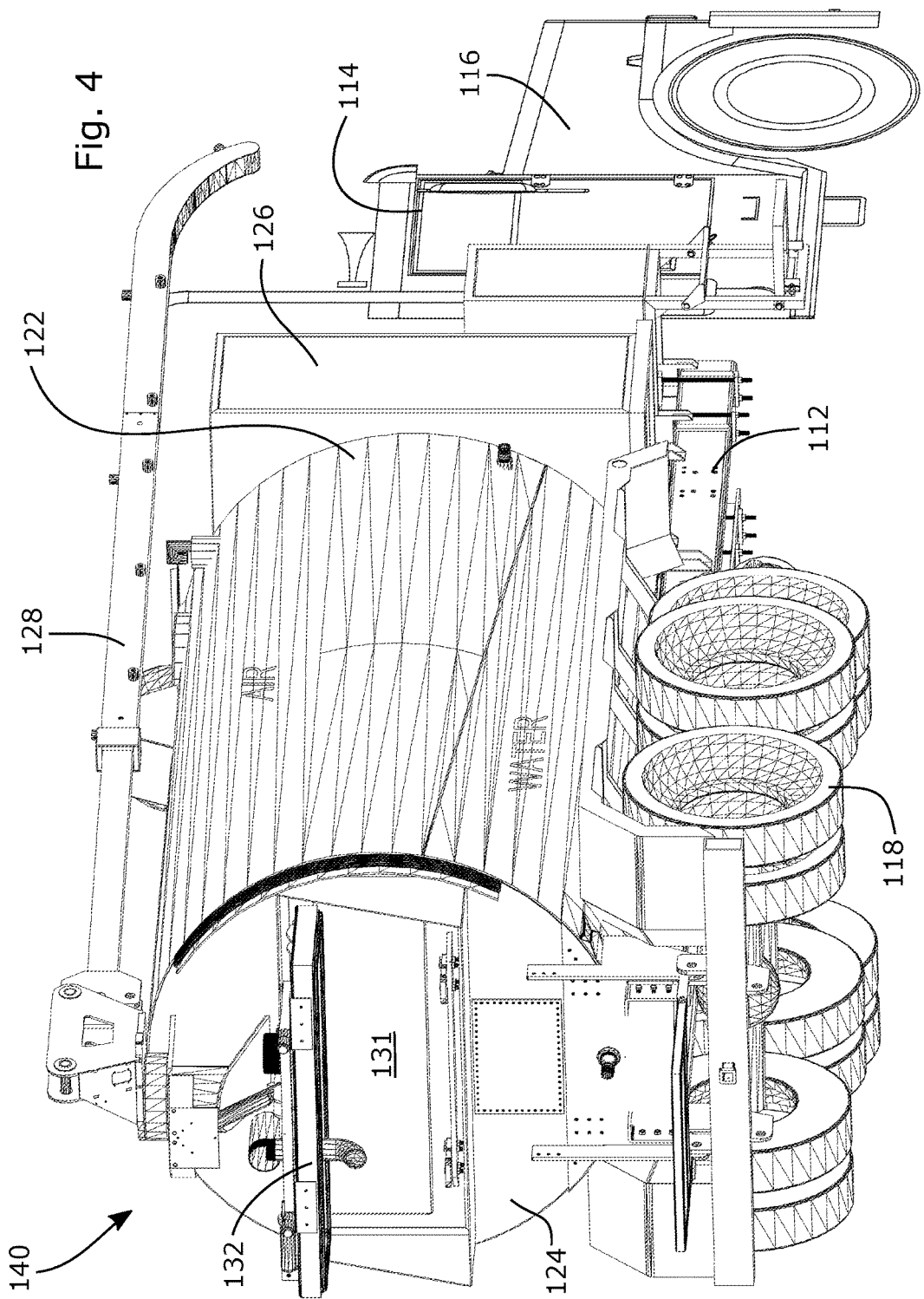
FIG. 4 is a rear perspective view of the hydrovac of FIG. 1 with dump door open.

The mud tank 122 has a hatch 131 (better seen in FIG. 3 and FIG. 4) and hydraulically operated cover 132 at the rear of the unit to allow dumping when the mud tank and water tank assembly 140 is raised to the dumping position shown in FIG. 2. Depending on the design of the mud tank 122, the dumping position will result from passage of the mud tank and water tank assembly 140 through a rotation angle of a set number of degrees, called here the dump angle. The assembly 140 may be lifted by a hydraulic lifting assembly 142 of conventional construction.

The water tank 124 is located under the mud tank 122, which in itself is conventional. However, in this case, the mud tank 122 deepens towards the front. The mud tank 122 may have a floor 134 that is flat, in which case the angle of the floor is downward toward the front of the unit. If the mud tank 122 has a floor 134 that is curved, then the average gradient is downward toward the front. The floor 134 should always have a slope in degrees that is lower than the dump angle, and be oriented oppositely. That is, while the floor 134 when viewed from the right side of the vehicle (looking forward) will be tilted down relative to horizontal in an acute angle in the clockwise direction, the dump angle will be a value measured counterclockwise. With the floor 134 having a slope less than the dump angle, in the dump position mud 136 in the mud tank 122 may exit the hatch 131 under force of gravity. To ensure efficient dumping, the dump angle should be larger than the floor slope by at least 10, 20, 30, 40 or 50 degrees. Exemplary angles are shown in the drawings.

With the mud weight going forward in the hydrovac, weight is distributed to the front of the vehicle 110 away from the wheels 118, enabling greater legal carrying capacity. The slope of the floor 134 means that, with a reasonable amount of water in the water tank 124, the hatch 131 is raised upward relative to existing hydrovacs. With a sufficiently high hatch, mud can be dumped directly into containers to be hauled away. With an air pocket needed above the mud in the mud tank 124, and considering that the unit should be too high, there is a limit to how high the hatch 131 can be placed. The floor 134 may slope downward from the hatch, and the floor steepness will determine the amount of water in the water tank 122. The slope of the floor 134 is therefore a balance between amount of water to be carried and desired forward weight shift, subject to the constraint that there must be enough space for the mud hatch within the rear of the hydrovac. Exemplary values for the tank capacities are shown in the figures.

The drive components (water or hydraulic pump, blower) of the hydrovac receive power from the engine of the hydrovac, typically a diesel engine. Power is supplied from the transmission of the engine via a shaft 150, which may be a split shaft with forward and rearward sections. A split shaft box 152 is secured on the hydrovac chassis between the forward and rearward sections of the split shaft 150 to allow connection of a belt drive 154 for a hydrovac blower 156. The split shaft box 152 may be a Muncie™ 880 split shaft box that has two 8-bolt PTO ports 158 on it. The Muncie™ 880 has a throughput HP rating of 22,000 foot-pounds of torque that the drive line 150 can put through it, which means that it is strong enough to handle all the load as required from a hydrovac application.

The split shaft box 152 may have one or more side ports for power take-offs (PTOs) that can run other power needs such as for a hydraulic pump or sludge pump drive to pump drilling mud at rigs. If, as with the Muncie™ 880, the box 152 was not built to handle side loading, then to allow side loading as with use of belt drives, the box 152 may need side loading support. Side loading support may be provided for example using a shaft support 160 with a bearing 162 on it to hold the side load torque. The split shaft box 152 disconnects the rear drive shaft (not shown), which is connected through a drive shaft output connection flange 161, and allows the front drive shaft to be turned at whatever gear and speed is needed for the hydrovac application. With a Muncie™ 880 for the split shaft box 152, the belt drive 154 may be run for example at 500 HP. The belt drive 154 includes a belt 164 and a belt tensioning system 166.

The belt 164 acts like a shock load dampener that stops the metal to metal shock loading of the blower, such as on blower rotor, bearings, shafts and gears, that occurs with gear drive systems. The use of a belt drive 154 allows mounting of the blower 156 up high on the truck frame to reduce piping and deck space used for piping. As compared with a gear box, the belt drive 154 is simpler, lighter, cheaper, quieter, and more easily accessible for maintenance, replacement and repair. The belt 164 is air cooled.

Figure 5:
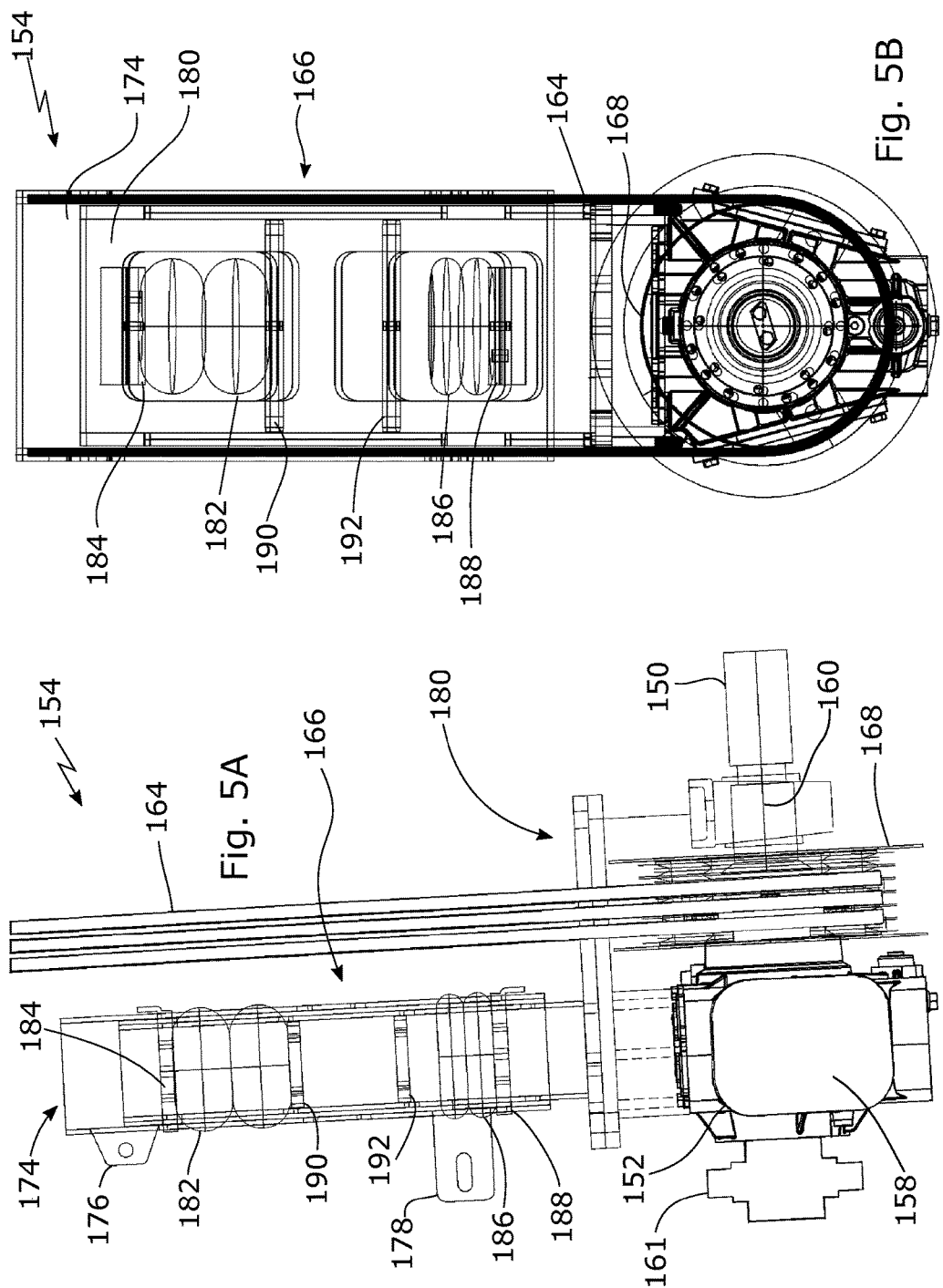
FIG. 5A and FIG. 5B show a belt drive for hydrovac blower in extended position.

The belt tensioning system 166 may be a double air bag tensioning system as shown. A pulley 168 is provided on one end of the split shaft box 152. The belt 164 extends around the pulley 168 onto a corresponding pulley 170 on the blower 156. The pulley 168 and split shaft box 152 may be moved up and down by the belt tensioning system 166. The belt tensioning system 166 may comprise a fixed frame 174 connected to the hydrovac frame by flanges 176 and 178. A sliding frame 180 is supported for sliding by the fixed frame 174. Various methods may be used for this. An upper air bag 182 has one side fixed in relation to a part 184 of the fixed frame 174. A lower air bag 186 has one side fixed in relation to a part 188 of the fixed frame 174. In its inflated condition, upper air bag 182 presses against a part 190 of the sliding frame 180 to move the sliding frame 180 downward, extend the belt and tighten the belt 164 on the pulleys 168 and 170. In the extended position, the lower air bag 186 is deflated. The extended position of the sliding frame 180 is shown in FIG. 5A and FIG. 5B.

Figure 6:
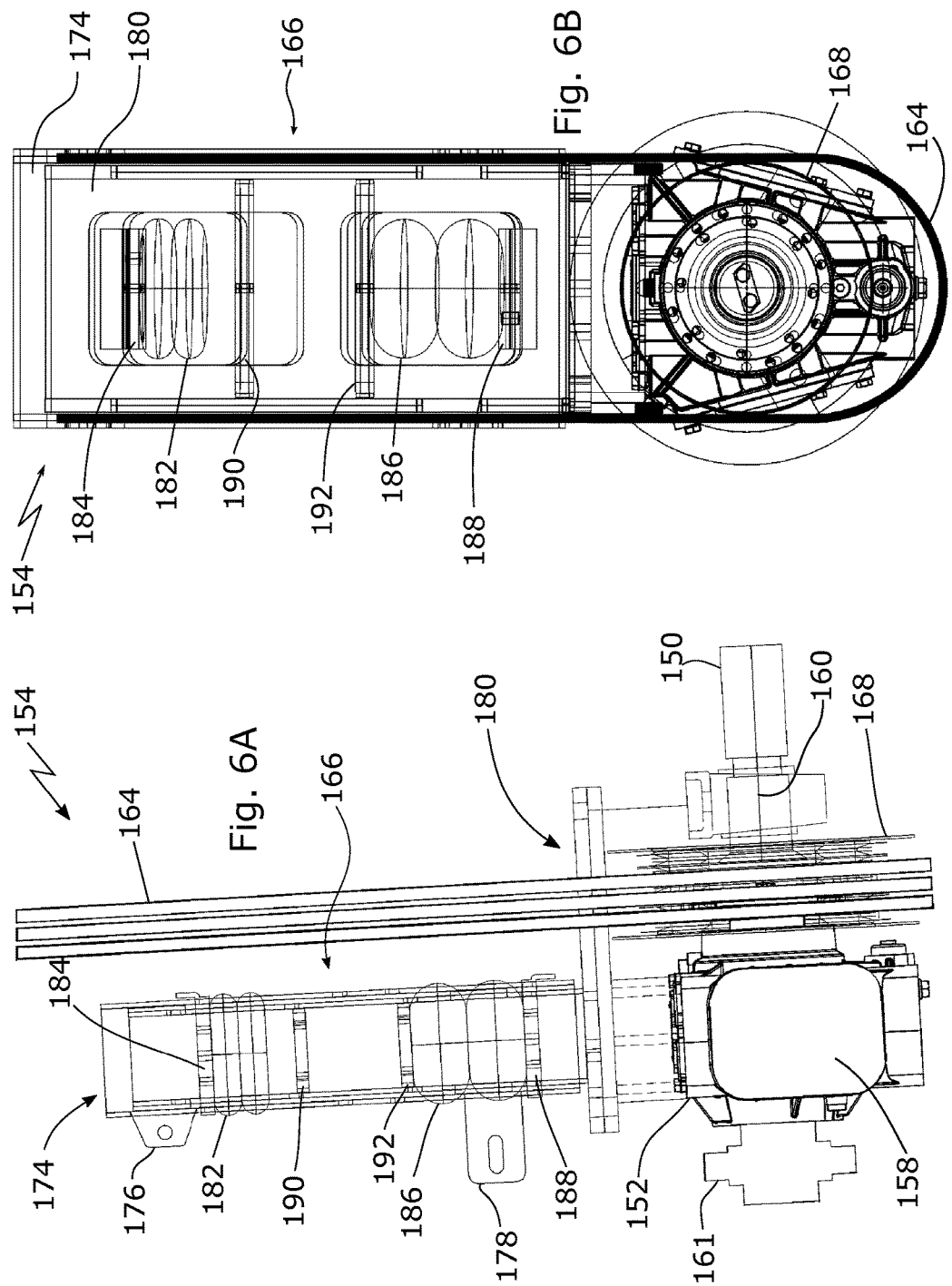
FIG. 6A and FIG. 6B show the belt drive in retracted position.
Figure 7:
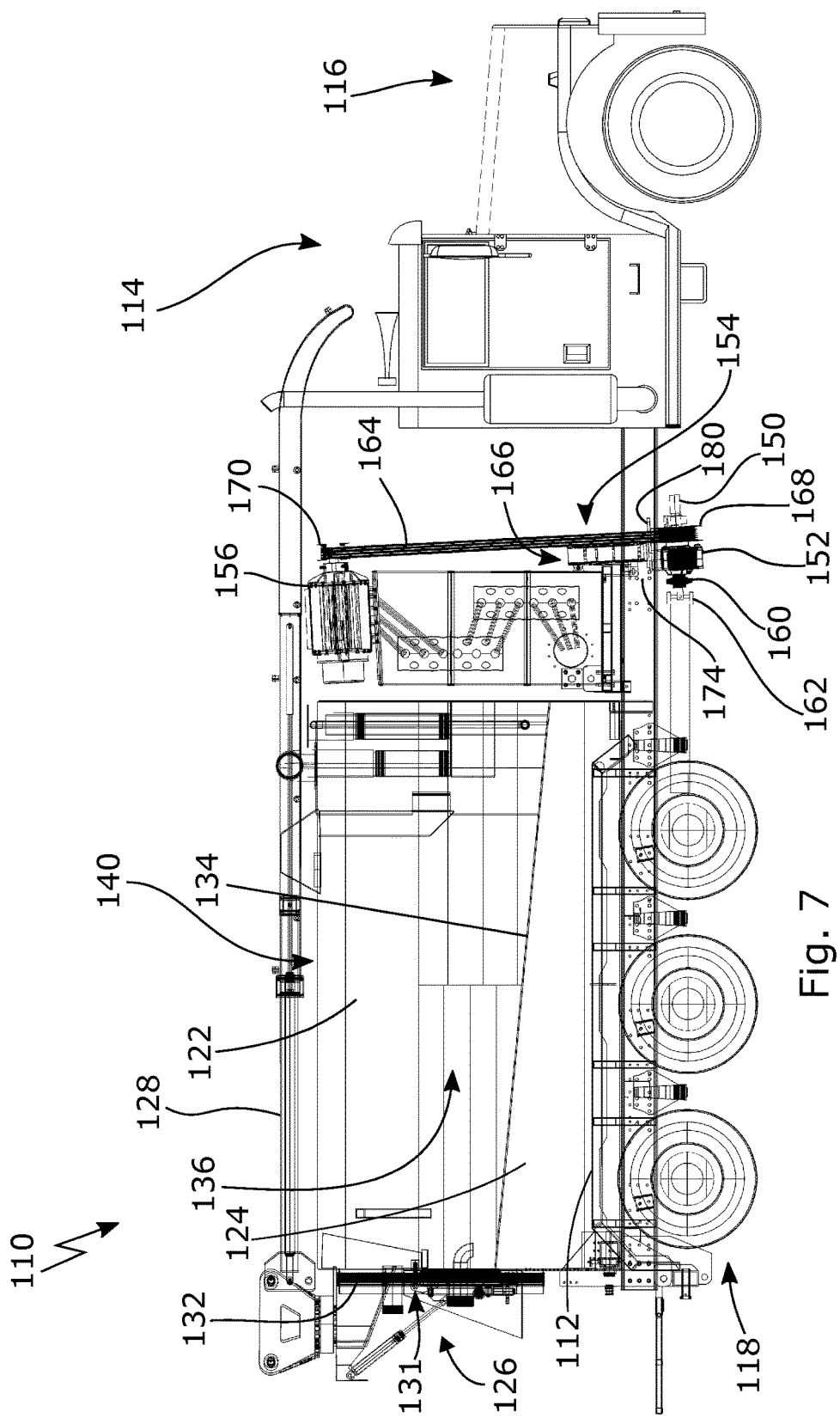
FIG. 7 is side view, partly cut away, of a further embodiment of a hydrovac.

In its inflated condition corresponding to a retraced position of the belt tensioning system 166, lower air bag 186 presses against a part 192 of the sliding frame 180 to move the sliding frame 180 upward, relax the belt 164 and loosen the belt 164 on the pulleys 168 and 170. In the retracted position, shown in FIG. 6A and FIG. 6B, upper air bag 182 is deflated.

By adjustment of the air supply to the bags 182, 186, tension on the belt 164 may be adjusted or removed as desired. Steady tension helps to stop the belt from becoming loose and also reduces belt slap and bouncing. Air is conventionally available on a hydrovac chassis to allow the belt tensioning system 166 to work very dependably in all conditions.

To summarize, one air bag 182 slides the tightening leg (sliding frame) 180 out to tighten and the other air bag 186 slides it back to loosen. The air bags 182, 186 are very simple and long lasting. They may hold steady adjustable pressure which is key to having a effective belt system. The blower 156 can be mounted high or in any elevation wanted, depending on belt length.

Figure 8:
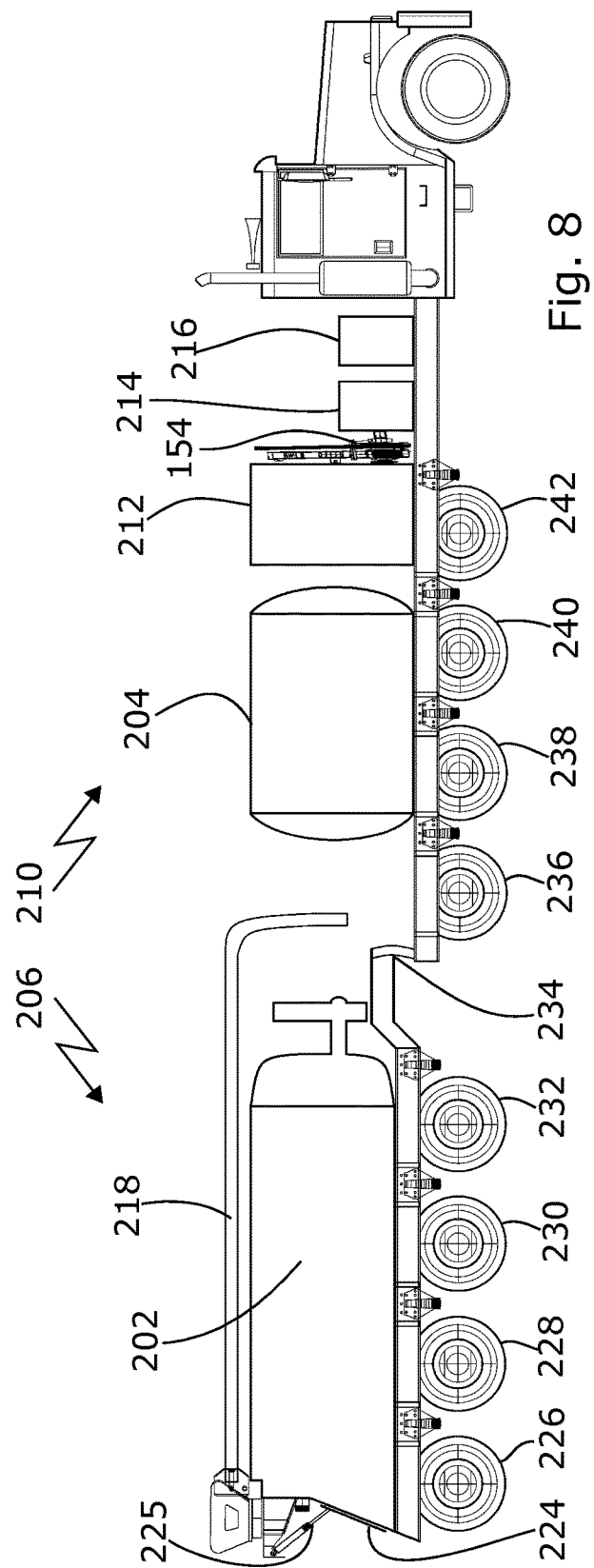
FIG. 8 shows an embodiment of a mud tank weight re-distribution apparatus.

Referring to FIG. 8, a further mud tank weight redistribution apparatus is disclosed. In this embodiment, the mud tank 202 is separated from a water tank 204, and placed on a trailer 206 behind the water tank 204. In this manner, the mud tank trailer 206 is articulated to the main hydrovac vehicle and is separate from the main chassis 208 of the hydrovac. The water tank 204 is mounted on the main chassis 208 of a vehicle 210 along with other such conventional equipment such as blower 212, water pump 214 and steamer pump 216. The mud tank trailer 206 also carries a boom 218 with vacuum hose 220 and dig tube 222. The mud tank 202 has a conventional rear dump door 224, and includes a hoist 225 for hoisting the mud tank 202 so mud can be dumped through the dump door 224.

The trailer 206 may be supported by a steerable rear tag 226, tandem axles 228 and 230, and a forward steerable tag pusher wheel set 232, and may be hitched to the vehicle 210 via hitch 234 to allow steering of the trailer 206. The vehicle 210 may include a steerable tag wheel set 236, tandem axles 238 and 240, and forward steerable pusher 242.

The belt drive 154 may be used on the vehicle 210 to driver blower 212. The resulting chassis can be therefore made shorter than otherwise would be the case. The trailer hitch and frame length makes the trailer follow the truck tracks so turning in the city streets is easy which is more convenient than a long truck. The chassis 208 now has lots of room for a big water tank 204 and two water pump skids 214 and 216. The blower and van body skid is also on the chassis and driven by the chassis engine through the belt drive 154. The mud tank 202 may be on a short trailer with hydraulic breaks so the driver does not need a CDL license. The trailer 206 steers right behind the truck tracks for tight turning. The mud tank 202 has the boom 218 and suction hose 220 on it so there are the same operating features as a truck mounted tank. The tank can haul 12 to 14 yards of mud legally and maybe more. Also the tank trailer 206 can be switched out with an empty one and taken to be dumped by a nurse truck that is cheap and simple.

The invention claimed is:

1. A hydrovac having a chassis, a mud tank and water tank forming a mud tank and water tank assembly mounted on the chassis, a hydraulic lift assembly capable of raising the mud tank and water tank assembly through a dump angle, the mud tank having a floor and a rear, the floor of the mud tank deepening forwardly, the water tank being located under the mud tank, and a hatch for the mud tank being located at the rear of the mud tank.

2. The hydrovac of claim 1 in which the floor of the mud tank slopes at an angle throughout less than the dump angle.

3. The hydrovac of claim 1 in which the dump angle is greater than the slope of the floor of the mud tank by at least 30 degrees.

4. The hydrovac of claim 1 in which the floor of the mud tank is flat.

5. A hydrovac having a chassis, a mud tank and water tank forming a mud tank and water tank assembly mounted on the chassis, a hydraulic lift assembly capable of raising the mud tank and water tank assembly through a dump angle, the mud tank having a floor and a rear, the floor of the mud tank sloping forwardly and downwardly at an angle less than the dump angle, the water tank being located under the mud tank, and a hatch for the mud tank being located at the rear of the mud tank.

6. The hydrovac of claim 5 in which the floor of the mud tank is flat.

7. A hydrovac having a chassis, a mud tank and water tank forming a mud tank and water tank assembly mounted on the chassis, a hydraulic lift assembly capable of raising the mud tank and water tank assembly through a dump angle, the mud tank having a floor and a rear, the floor of the mud tank sloping forwardly and downwardly at an angle less than the dump angle, the water tank being located under the mud tank, and a hatch for the mud tank being located at the rear of the mud tank.

8. The hydrovac of claim 7 in which the floor of the mud tank is flat.

9. The hydrovac of claim 1, further comprising:
a blower for the mud tank;
a split shaft drive system mounted on the chassis;
a split shaft box on the split shaft drive system; and
a belt drive for the blower powered by the split shaft box.

10. The hydrovac of claim 9 in which the belt drive comprises a drive pulley on the split shaft box, a blower pulley on the blower and a belt connecting the drive pulley and the blower pulley.

11. The hydrovac of claim 10 in which the belt drive comprises a tensioning system for the belt.

12. The hydrovac of claim 11 in which the tensioning system is pneumatically driven.

13. The hydrovac of claim 12 in which the tensioning system comprises an upper air bag and a lower air bag, the upper air bag being arranged to tighten the belt, and the lower air bag being arranged to loosen the belt.

14. The hydrovac of claim 9 in which the mud tank is articulated to the hydrovac vehicle.

15. The hydrovac of claim 1 in which the mud tank is articulated to the chassis.

16. The hydrovac of claim 15 further comprising a drive shaft on the chassis, a blower mounted on the chassis and a belt drive connected between the drive shaft and blower to drive the blower.

17. The hydrovac of claim 16 in which the belt drive has a pneumatically operated tensioning system.

* * * * *